US012661768B1

(12) United States Patent
Carter

(10) Patent No.: US 12,661,768 B1
(45) Date of Patent: Jun. 23, 2026

(54) DEVICES AND METHODS FOR ATTACHING CLADDING TO WINDOWS AND DOORS

(71) Applicant: SOUTHERNCARLSON, INC., Omaha, NE (US)

(72) Inventor: Steven Sean Carter, Hortonville, WI (US)

(73) Assignee: SOUTHERNCARLSON, INC., Omaha, NE (US)

( * ) Notice: Subject to any disclaimer, the term of this patent is extended or adjusted under 35 U.S.C. 154(b) by 0 days.

(21) Appl. No.: 19/175,945

(22) Filed: Apr. 10, 2025

(51) Int. Cl.
*B25C 1/04* (2006.01)
*B25C 1/00* (2006.01)
*E06B 3/30* (2006.01)

(52) U.S. Cl.
CPC .............. *B25C 1/047* (2013.01); *E06B 3/308* (2013.01); *B25C 1/008* (2013.01)

(58) Field of Classification Search
CPC .................................. E06B 3/308; B25C 1/00
See application file for complete search history.

(56) References Cited

PUBLICATIONS

Interchange Pro, "Interchange Brands Operator's Manual"; Model CN32-PZ PRO, Item No. 65774, 24 pages.
Interchange Pro, "Mini Coil Nailer"; Model CN32-PZPRO, Item No. 65774, 2 pages.

*Primary Examiner* — Daniel Jeremy Leeds
(74) *Attorney, Agent, or Firm* — Hovey Williams LLP

(57) ABSTRACT

A method for attaching cladding to a frame of a door or window using a pneumatic device and a customized tip attached to the pneumatic device. The method includes the steps of placing cladding against the frame, placing or pressing two prongs of the customized tip in a channel of the cladding, and actuating a scrail through an opening of the customized tip. The customized tip may further include shoulders pressed against opposite top edges of the channel when the two prongs are placed into the channel. Actuating of the scrail through the opening of the customized tip may include actuating or shooting the scrail outward between the two prongs, through the cladding, and at least partially into the frame via the pneumatic device while the shoulders are pressed against the opposite top edges of the channel and the two prongs are paced into the channel.

17 Claims, 7 Drawing Sheets

DEVICES AND METHODS FOR ATTACHING CLADDING TO WINDOWS AND DOORS

BACKGROUND OF THE INVENTION

External door cladding is typically added over an existing door frame surface in order to increase its durability and weather resistance. Common cladding materials include wood, metal, plastic, vinyl, or composite materials. Cladding can also be applied to other types of door and/or window frames. To secure cladding or a protective layer onto the surface of an exterior door frame, adhesives, screws, and/or nails are traditionally applied. The traditional way to attach cladding is slow, using drills and screws. These techniques also come with risks of people getting hurt on the job, including drilling fingers, poking fingers with screws, and overuse wrist injuries. For example, wrist injuries can occur due to workers putting small screws in a channel of the door cladding and using the drill to fasten the cladding to the door frame, thus placing torque on the worker's wrist all day long.

Thus, there is a need for an improved apparatus and method for attaching cladding to doors and windows that overcomes the deficiencies of the prior art.

SUMMARY OF THE INVENTION

Embodiments of the current invention address one or more of the above-mentioned problems and provide a distinct advance in the art of cladding attachment. In one or more embodiments, a method for attaching cladding to a surface using a pneumatic device includes the steps of placing the cladding against the surface for attachment thereto and placing at least a portion of a customized tip into a channel of the cladding at a first location along a length of the channel. The customized tip thereby presses the cladding against the surface at the first location. The customized tip is a hollow no mar tip attached to the pneumatic device and modified such that a first portion of the customized tip has a reduced length corresponding to a depth of the channel and a reduced width less than a width of the channel. The method also includes a step of actuating a scrail through an opening of the customized tip, through the cladding, and at least partially into the surface via the pneumatic device.

In another embodiment, a method for attaching cladding to a frame of a door or window using a pneumatic device and a customized tip attached to the pneumatic device. The method includes the steps of placing cladding against the frame, placing or pressing two prongs of the customized tip in a channel of the cladding, and actuating a scrail through an opening of the customized tip. The customized tip may further include shoulders pressed against opposite top edges of the channel when the two prongs are placed into the channel. Actuating of the scrail through the opening of the customized tip may include actuating or shooting the scrail outward between the two prongs, through the cladding, and at least partially into the frame via the pneumatic device while the shoulders are pressed against the opposite top edges of the channel and the two prongs are paced into the channel.

In yet another embodiment, a device for attaching cladding to a frame of a door or a window as a pneumatic device and a customized tip. The pneumatic device may output a fastener having screw threads via pneumatic pressure and may include a body and a nose extending from the body. The nose may present an opening through which the fastener is expelled via the pneumatic pressure. The customized tip attached to the pneumatic device may have a first hollow cylindrical section seated onto or against the body and having a first outer diameter and may further have a second narrow section that is narrower than the first outer diameter and is sized and shaped to be seated within a channel of the cladding.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 2:
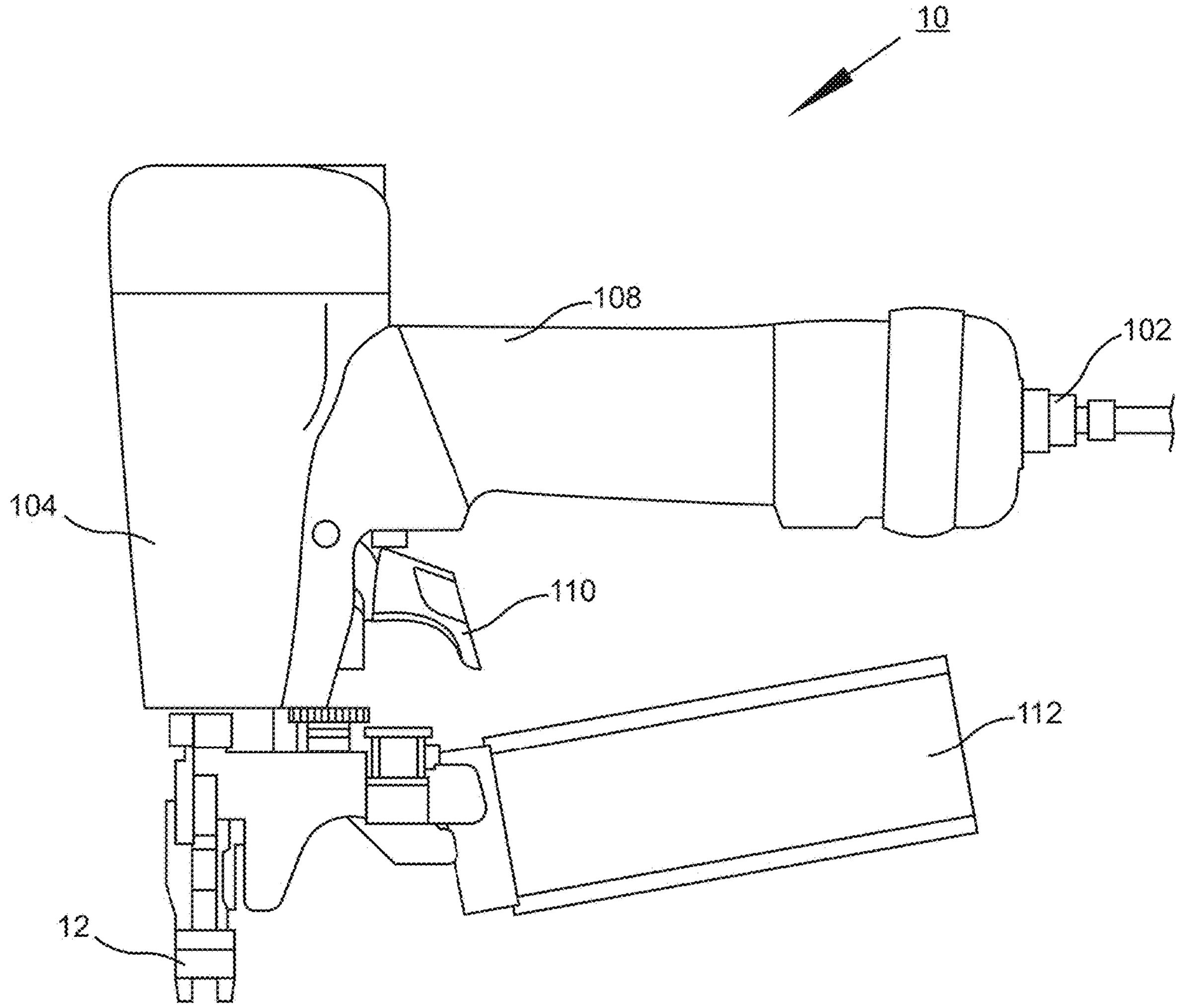
FIG. 2 is a plan view of the pneumatic device of FIG. 1 including a customized tip in accordance with embodiments herein.
Figure 4A:
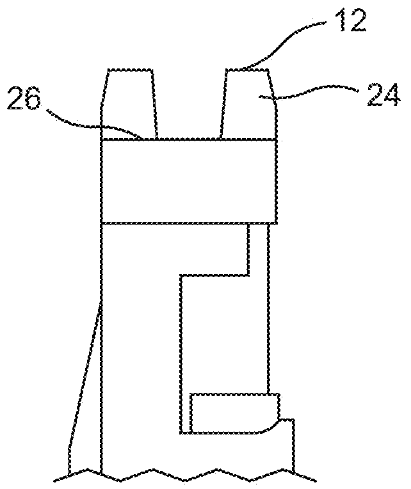
Figure 4B:
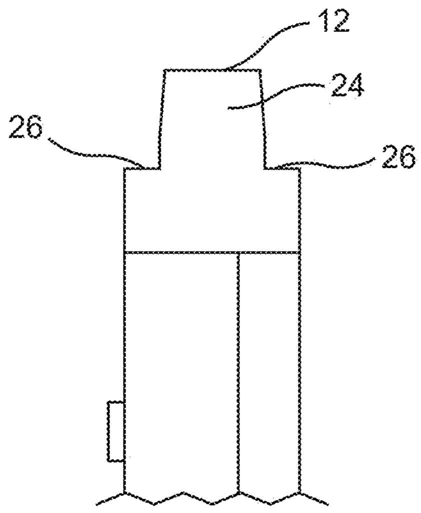
Figure 4C:
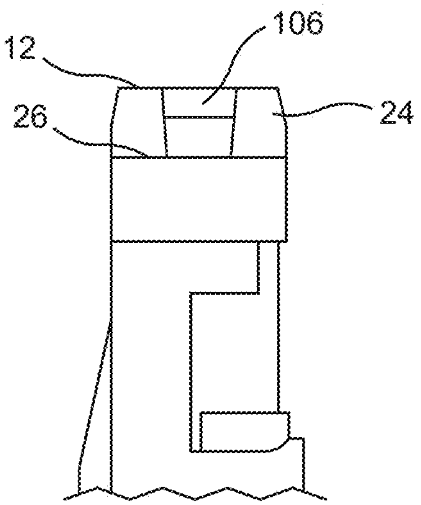
Figure 4D:
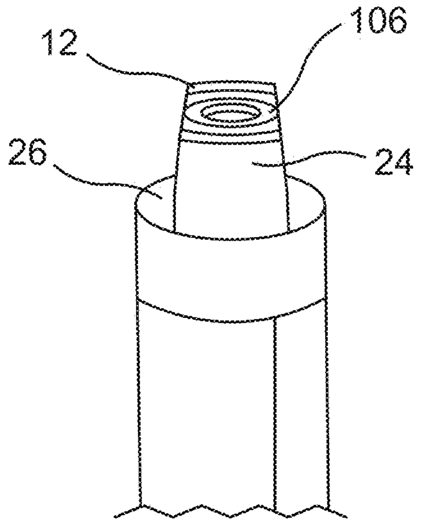
Figure 5:
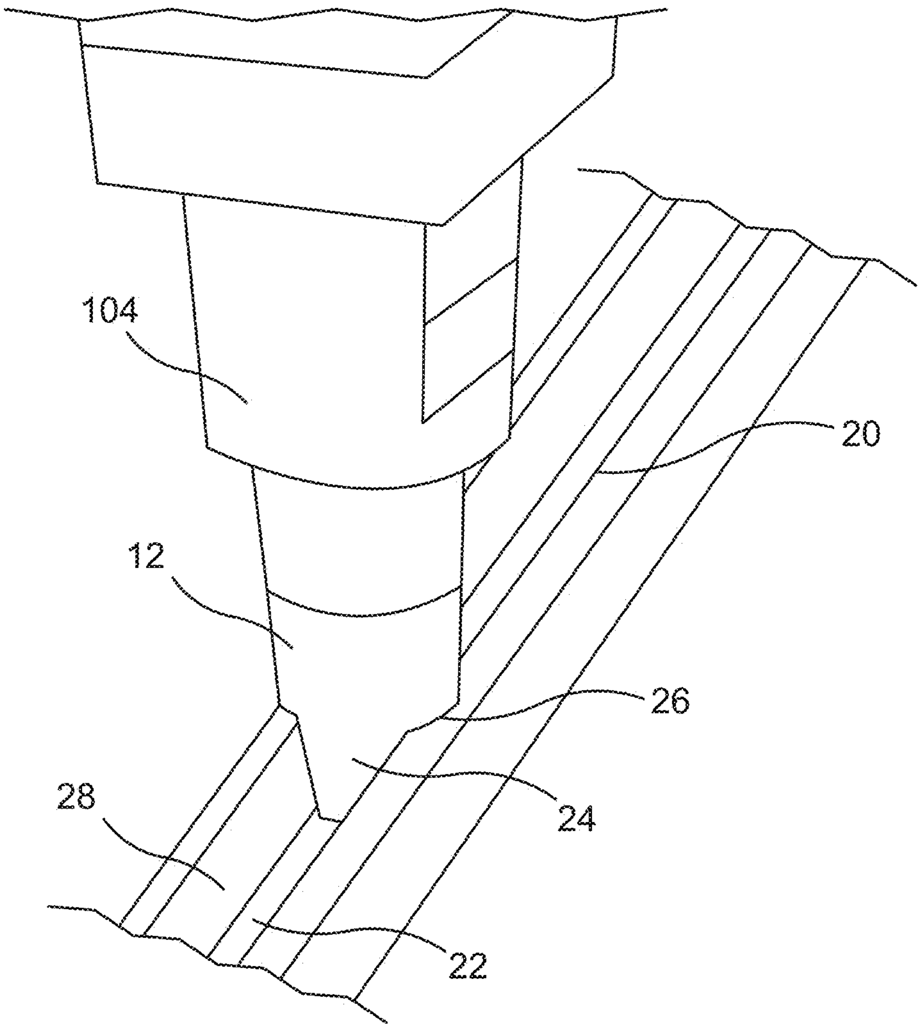
Figure 6:
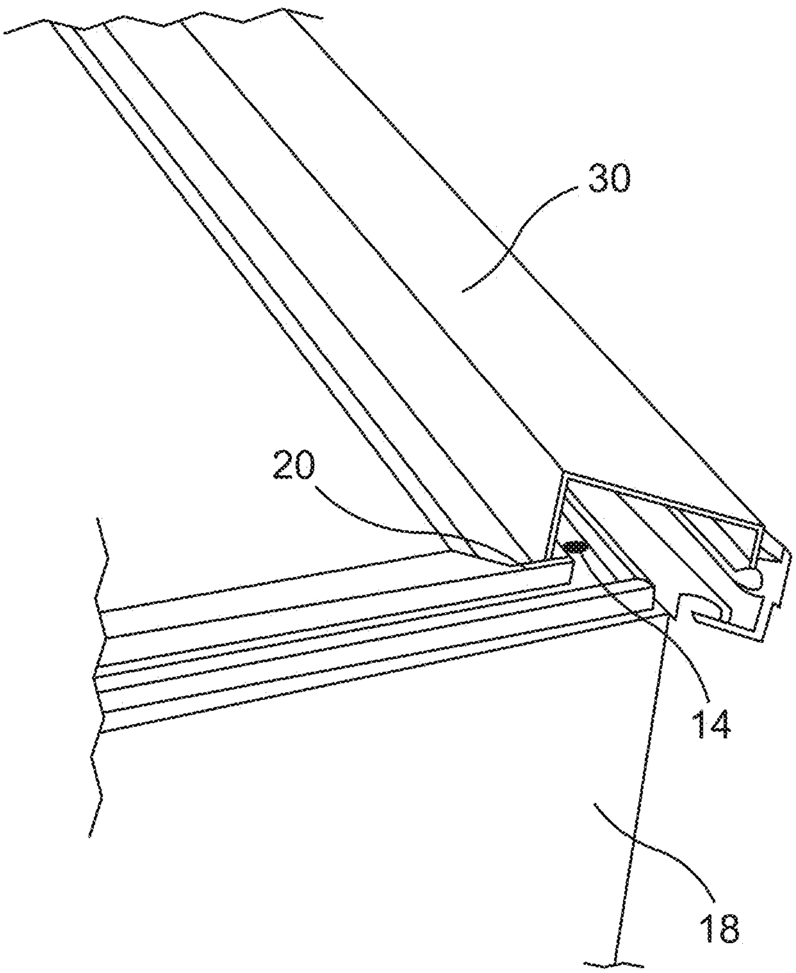
Figure 7:
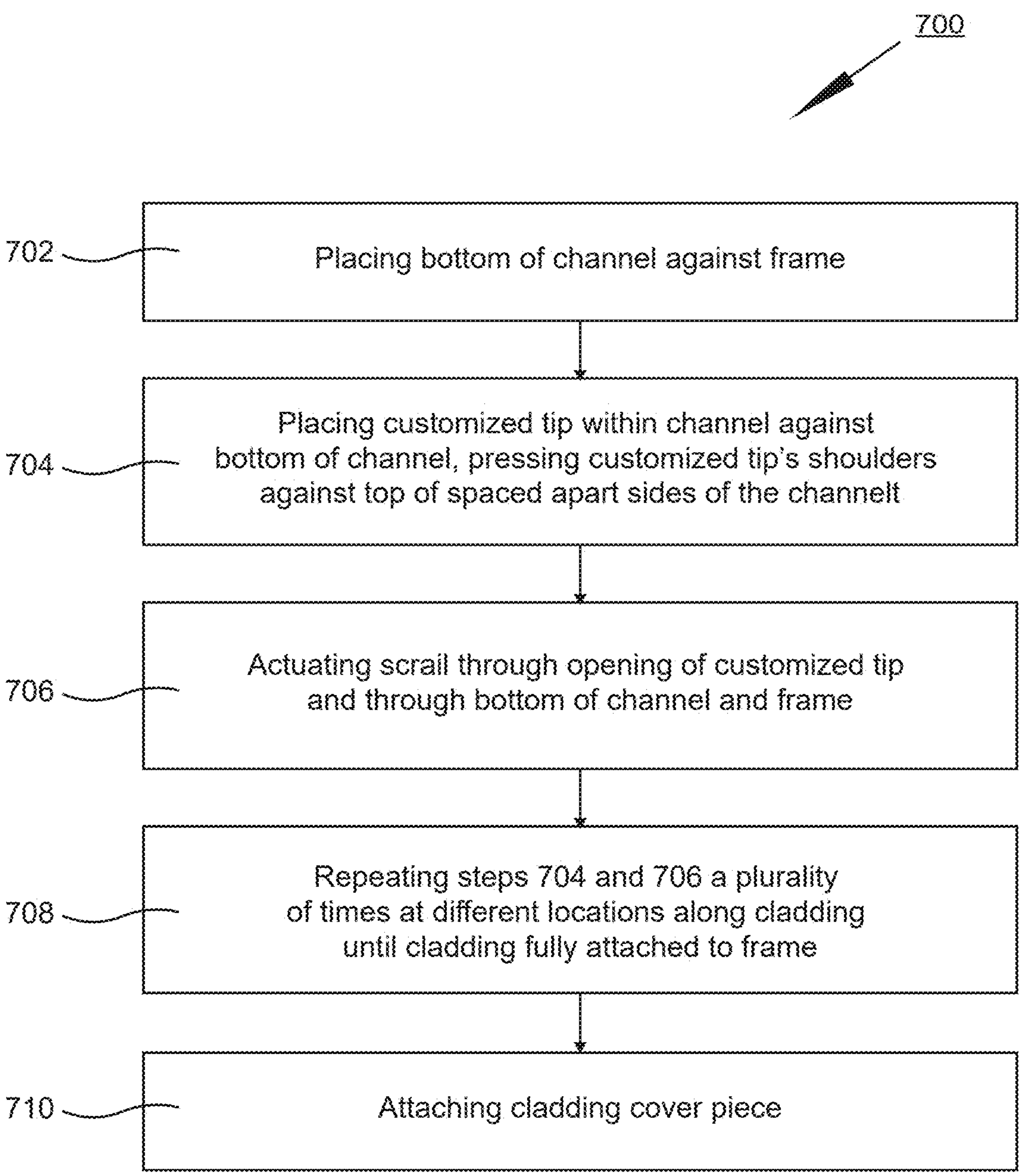

FIG. **4*a* is a side plan view of the customized tip on an end of the pneumatic device of FIG. 2** in accordance with embodiments herein;

FIG. **4*b* is a rear plan view of the customized tip on the end of the pneumatic device of FIG. 2** in accordance with embodiments herein;

FIG. **4*c* is a side plan view of the customized tip of FIG. 4*a*** with a nose of the pneumatic device located substantially flush or even with an end of the customized tip in accordance with embodiments herein;

FIG. **4*d* is a rear perspective view of the customized tip of FIG. 4*b*** with the nose located substantially flush or even with the end of the customized tip in accordance with embodiments herein;

FIG. 5 is an enlarged view of the pneumatic device and customized tip of FIG. 2 inserted into a channel of the cladding for driving a scrail therethrough in accordance with embodiments herein;

FIG. 6 is an environmental view of the cladding and the door frame, with a cladding cover piece attached to the cladding in accordance with embodiments herein; and FIG. 7 is a flow chart depicting a method of attaching cladding to a door frame in accordance with embodiments of the present disclosure.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Using a pneumatic tool for attaching cladding to frames of doors and/or windows is faster and safer for users and causes less wear and tear on the user's body. However, traditional pneumatic tools are insufficient for attaching cladding. For example, cladding is typically installed using screws, and nail guns are not traditionally used to fasten screws. Alternatively, a type of fastener that combines features of screws and nails is known as "scrails," such as the scrails manufactured by Beck Fastening of Mauerkirchen, Austria or Fasco Fasteners of Alsip, IL. Scrails are generally designed to be driven using a traditional pneumatic nailer but include screw threads to offer better holding power than a standard nail. For detaching, the scrail can then be backed out using a drill, just as with traditional screws. Cladding can be attached to a frame of an exterior door, for example, in around 30 seconds using scrails and traditional pneumatic nailers, whereas traditional screwing on of the cladding takes five to twelve minutes, requiring drilling holes in the cladding and then inserting and tightening a wood screw in the holes just drilled.

However, using a traditional pneumatic nailer for attaching cladding on a frame of a window or door with scrails can be difficult, because it requires shooting a scrail into a small (e.g., ⅜-inch to ½-inch) channel and getting the scrail to seat at the bottom of the channel such that the scrail sucks the cladding against the wood of the door frame or window frame. A traditional pneumatic nailer is generally insufficient for this task and can lead to loose cladding, which is undesirable.

Figure 1:
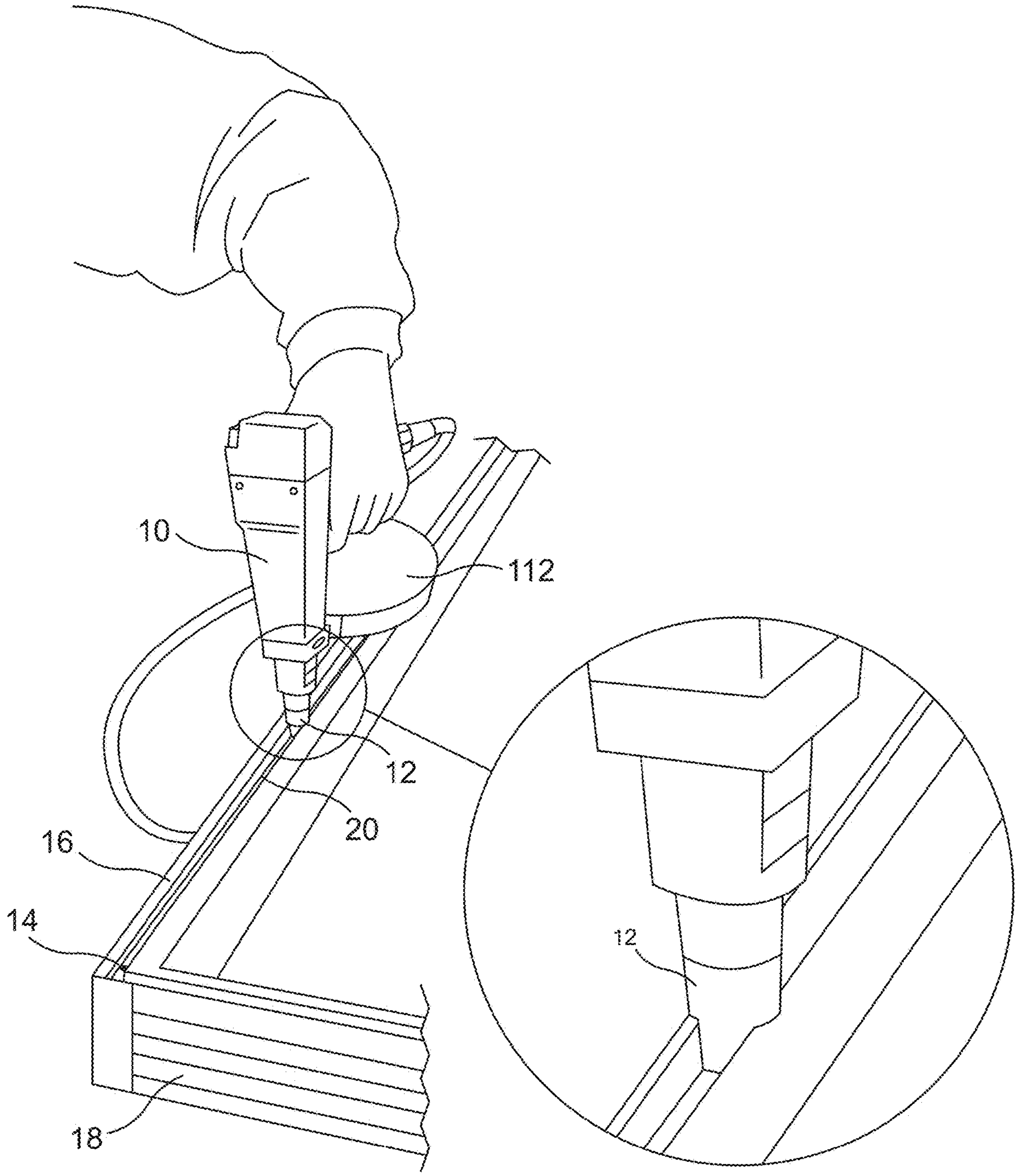
FIG. 1 is an environmental view depicting a pneumatic device attaching cladding to a door frame in accordance with embodiments herein.

Thus, the present disclosure addresses these and other problems with the use of a pneumatic device 10, as depicted in FIG. 1, with a customized tip 12 for shooting fasteners such as scrails 14 through cladding 16 to be attached to a door frame 18 (or other types of frames such as window frames). Specifically, the pneumatic device 10 may be configured for providing enough power or pneumatic pressure (e.g., 120 PSI) to shoot through an aluminum cladding and the customized tip 12 is sized and shaped to be fully seated within a channel 20 of the cladding 16, as depicted in FIG. 5, such that the scrail 14 sets flush at a bottom 22 of the channel 20 once installed. By placing the customized tip 12 of the pneumatic device 10 into the channel 20 and in contact with the bottom 22 of the channel 20, a desired depth of drive with the scrail 14 or other such fasteners is achieved.

In some embodiments, as depicted in FIG. 2, the pneumatic device 10 may be fluidly couplable to a source of compressed air (not shown) and have many similar components to a pneumatic nail gun. In some embodiments, the pneumatic device 10 includes hoses 102 for a compressed air power supply (e.g., 120 PSI), a body 104 that supports an actuatable piston and/or driver blade that drives the scrails 14 or other such fasteners out through an opening through a nose 106 of the body (e.g., a hollow barrel or head of the body), and a handle 108 supporting the body 104 and including a trigger 110 or valve release that actuates the piston via the compressed air to shoot the scrails 14 through the opening of the nose 106. In some alternative embodiments, instead of using compressed air, the pneumatic device 10 may use electromagnetism, highly flammable gasses (e.g., butane or propane), or small explosive charges to forcefully drive the scrails 14 from the body 104 of the pneumatic device 10 into the cladding 16 and/or the door frame 18, the window frame, or the like. In other alternative embodiments, a pressure boosting attachment at an end of the handle 108 may be added and may be configured to boost the pneumatic force provided to the scrails 14. For example, an extra air storage unit may be added to the pneumatic device 10 to boost the power or force thereof, which helps drive longer fasteners like some of the scrails 14 more effectively. Other similar pneumatic devices configured for driving fasteners such as scrails or nails at a force sufficient to pierce the cladding 16 and the door frame 18 may be utilized along with the customized tip 12 described herein without departing from the scope of the technology herein.

In addition to the trigger 110 or valve release, some embodiments of the pneumatic device 10 further include a bump fire or sequential fire selection option, which selectively allows the pneumatic device 10 to be placed into a configuration that outputs either a single one of the scrails 14 or multiple ones of the scrails 14 respectively based on one squeeze of the trigger 110. Although exemplary embodiments of the pneumatic device 10 are described herein, note that other pneumatic devices such as standard nail guns, scrail guns, or the like may be used along with the customized tip 12 without departing from the scope of the technology disclosed herein.

The scrails 14 may come in a magazine, cartridge 112 (as depicted in FIGS. 1 and 2), or other structures that gang the scrails 14 together to be selectively positioned, one by one, in front of the piston of the pneumatic device 10. For example, clips of paper, plastic, or fine welded wire can be used to join the scrails 14 into a magazine or cartridge, and the pneumatic device 10 may be configured to pull in a subsequent scrail therefrom once an earlier adjacent scrail is output by the pneumatic device 10. As described above, the fasteners may be the scrails 14 or may be other fasteners with screw threads wrapped therearound without departing from the scope of the technology described herein.

Figure 3:
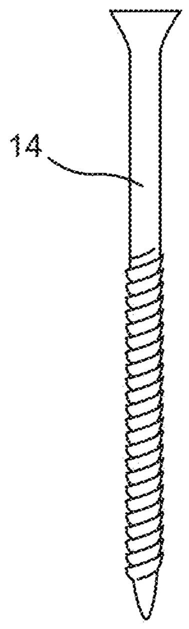
FIG. 3 is a plan view of a scrail used with the pneumatic device of FIG. 2 in accordance with example embodiments herein.

As depicted in FIG. 3, the scrails 14 may have any head design, such as a Phillip's, Square, Pozidrive, Torx, flat, composite, or combo trim head without departing from the scope of the technology described herein. Furthermore, the scrails 14 may include any type of screw threads known in the art, such as fine, course, double threads, or the like. The scrails 14 may also have any of a variety of coatings known in the art, such as yellow zinc coating, hot-dipped galvanized coating, or any other coating or corrosion-resistant coating known in the art.

As depicted in FIGS. 4*a*-4*d*, the customized tip 12 may be made of any rigid material such as plastic or any material used for no mar tips known in the art and may be attached to the body of the pneumatic device's barrel or head at the opening. Traditionally, no mar tips on nail guns are designed with a soft, non-abrasive material on a contact point, head, or nose 106 of the nail gun to prevent damage to surfaces being nailed into. Likewise, the customized tip 12 can be placed onto the nose 106, the end of the barrel, and/or the head of the pneumatic device 10. Specifically, an opening formed through the customized tip 12 may align with the opening of the body or the barrel such that the scrails 14 are configured to be positioned therein and shot outward therethrough. In some embodiments, the customized tip 12 may be slid over or integrally formed to an end of the barrel or head of the pneumatic device 10. In some embodiments, the customized tip 12 may be a no mar tip configured to be inserted over the nose 12, barrel, or head of the pneumatic device 10, protecting wood surfaces or the like from damage at the contact point of the material into which the scrails 14 are being inserted or driven into and/or through. As with conventional no mar tips, the customized tip 12 may be made of soft material having a non-abrasive surface, such as soft rubber or plastic material with a smooth surface, although other materials may be used without departing from the scope of the disclosure herein. However, unlike conventional no mar tips, ends of the customized tip 12 may be short enough such that its tip or ends are aligned substantially in a same plane with an end of the nose 106 of the pneumatic device 10, at least when a safety of the pneumatic device 10 is depressed so that pneumatic device 10 is ready to be used.

As depicted in FIG. 5, the customized tip 12 may be sized and shaped to fit within a channel of the cladding, as later described herein. For example, the customized tip 12 may be comprised of a cylinder with an inner surface having a circular cross-section sized and shaped to slide over the nose 106 of the pneumatic device, and to attach to the body 104 using any attachment methods know in the art. Furthermore, the customized tip 12 may include a first cylindrical section seated onto the body 104, and a second narrow section that includes at least one contact surface configured for contacting the cladding 16 for attachment thereof. In some embodiments, the contact surface of the second narrow section may be aligned substantially or approximately in the same plane with the nose 106, at least when the safety of the pneumatic device 10 is depressed so that the pneumatic device 10 is ready for use when the trigger 110 is pulled. The at least one contact surface may be substantially flat in order to press against a surface of the channel 20, such as the bottom 22 thereof.

In some embodiments, as depicted in FIGS. 4*a*-4*d*, the second narrow section of the customized tip 12 may comprise two prongs 24 extending from the first cylindrical section and narrower than a diameter of the first cylindrical section. For example, the second narrow section may be at least slightly narrower than a width of the channel 20 (e.g., ⅜-inch to ½-inch or ¼-inch to ⅝-inch), such that the two prongs 24 extend down into the channel 20, while the first cylindrical section presents one or more shoulders 26 outward of the channel 20. The shoulders 26 may comprise portions of the customized tip 12 that are too wide to fit within the channel 20 and thus are capable of resting outward on top edges of the channel 20 while the prongs 24 are fully seated within the channel 20. In some embodiments, the two prongs 24 may have curved surfaces corresponding to a curvature of the first cylindrical section from which the two prongs 24 extend. Side edges of each of the prongs 24 may, in some embodiments, each be substantially planar, with opposing ones of the side edges substantially perpendicular to each other. This allows the side edges of the prongs 24 to maintain the customized tip 12 in substantially perpendicular alignment with a bottom surface of the channel 20.

In order to construct the customized tip 12, in some embodiments a no mar tip or any other hollow cylindrical tip having inner and the outer surfaces of circular cross-sections has two opposing sections of the outer surfaces cut or shaved off or even two opposing sections of the outer and inner surfaces cut or shaved off. This may leave the two prongs 24 behind, each with two planar side portions located opposite each other on the customized tip 12. In some embodiments, a cylindrical portion of the no mar tip or other hollow cylindrical tip may remain behind in order to serve as the shoulders 26 which extend further outward from a center axis of the customized tip 12 than a minimum width of the two prongs 24, such that the two prongs 24 fit into the channel 20 and the shoulders 26 limit the depth at which the customized tip 12 can be inserted into the channel 20.

As depicted in FIGS. 1 and 5, the cladding 16 may be an elongated rigid component applied to a surface or edge of the door frame 18 or the window frame and may include the channel 20 configured for being attached to the door frame 18. The channel 20 may comprise the bottom 22 or bottom wall and two sides 28 or side walls spaced apart from each other by a width of the bottom 22. The bottom 22 may be attached substantially flush to the door frame 18 and/or the window frame in accordance with methods and configurations described herein. In addition, the cladding 16 may include a cladding cover piece 30 configured for sliding on or snap-fitting onto or into the channel 20, as depicted in FIG. 6. This can be done for aesthetic or protective purposes. For example, outer surfaces of the channel 20 or the cladding 16 may comprise elongated protrusions or rails configured to slidably engage with one or more channels of the cladding cover piece 30. However, other features, components, and/or techniques for attaching the cladding cover piece 30 to cover the channel 20 may be used without departing from the scope of the disclosure herein. In some embodiments, the cladding 16, such as the channel 20 and/or the cladding cover piece, can be made from a variety of materials, including wood, plastic, metal, or composite materials.

A width of at least a portion of the customized tip 12 may be sized sufficiently narrow as to fit between the two sides 28 of the channel 20 and contact or be positioned proximate to the bottom 22 of the channel 20 when the shoulders 26 or first cylindrical portion of the customized tip 12 are resting outward of the channel 20 (e.g., resting on top edges of the two spaced apart sides 28 of the channel 20). In some embodiments, the amount of clearance between the customized tip 12 and the two spaced apart sides 28 of the channel 20 may be sufficiently small so as to limit side-to-side movement of the customized tip 12 when placed into the channel 20. Furthermore, the depth of the channel 20 may be substantially equal to a length of the second narrow section customized tip 12, such that the at least one contact surface and/or the end of the nose 106 makes contact with the bottom 22 of the channel 20 when the shoulders 26 or the first cylindrical portion rests outward of the channel on the top edges of the two spaced apart sides 28 of the channel 20.

The door frame 18 may be an exterior door or an interior door frame. However, cladding is traditionally placed on exterior doorframes. Furthermore, the door frame 18 may be replaced with a window frame around a window without departing from the scope of the technology described herein. The cladding 16 may be attached to surfaces or edges of the door frame 18 via the pneumatic device 10 with the customized tip 12 attached thereto, such that the prongs 24 of the customized tip 12 fit into the channel 20 for driving one of the scrails 14 through the cladding 16 and the door frame 18 or any other surface requiring attachment of a base of a narrow channel thereto.

The flow chart of FIG. 7 depicts an exemplary method 700 for attaching cladding to a surface in more detail. In some embodiments, various steps may be omitted, or steps may occur out of the order depicted in FIG. 7 without departing from the scope of the technology as described herein. For example, two blocks shown in succession in FIG. 7 may in fact be executed substantially concurrently, or blocks may sometimes be executed in the reverse order depending upon the functionality involved.

In some embodiments, the method 700 may include a step of placing the bottom 22 of the channel 20 (e.g., a backside of the bottom 22) against the frame 18 or other surface for attachment thereto, as depicted in block 702 and pressing the nose 106 of the pneumatic device 10 and the customized tip 12 against the cladding 16 at a location within the channel 20, as depicted in block 704. Specifically, an end edge of the pneumatic device's nose 106 and the contact surface of the customized tip 12 may be pressed flush against the bottom 22 of the channel 20 and the shoulders 26 of the customized tip 12 may rest on top of the two spaced apart sides 28 of the channel 20, such as on top edges thereof.

Next, the method 700 includes a step of actuating at least one of the scrails 14 to be shot through the bottom 22 of the channel 20 and the door frame 18, as depicted in block 706, while customized tip 12 continues to be pressed against the cladding 16 as described above. This may drive the one or more scrails 14 through the bottom 22 of the channel 20 and the door frame 18 at any desired or required PSI, such as 120 PSI or other pressures known in the art for the insertion of scrails. The actuating may be accomplished by squeezing of the trigger 110 of the pneumatic device 10 or by some other operator manipulation of the pneumatic device 10. In some embodiments, the pneumatic device 10 and/or the cladding 16 must also be held down tightly by an operator to prevent recoil during the actuating of the scrails 14 via the pneumatic device 10.

The above listed steps 704 and 706 may be repeated one or more times at different locations along the bottom 22 of the channel 20, as depicted in block 708, until the cladding 16 is properly attached to the door frame 18 or alternatively to a window frame or other such surface. In some embodiments, the method 700 may further include sliding on or snap-fitting a cladding cover piece 30 onto the cladding 16, as depicted in block 710, in order to provide a decorative and/or protective covering over the channel 20.

Although method 600 and the figures depicted herewith are directed toward attaching cladding to a door frame, note that these method steps and devices described herein can be used to attach a cladding with a narrow channel to any surface (e.g., a window frame or other building structures) without departing from the scope of the technology herein.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for attaching cladding to a surface using a pneumatic device, the method comprising:

placing the cladding against the surface for attachment thereto;

placing at least a portion of a customized tip into a channel of the cladding at a first location along a length of the channel, thereby pressing the cladding against the surface at the first location, wherein the customized tip is a hollow no mar tip attached to the pneumatic device and modified such that a first portion of the customized tip has a reduced length corresponding to a depth of the channel and a reduced width less than a width of the channel; and actuating a scrail through an opening of the customized tip, through the cladding, and at least partially into the surface via the pneumatic device.

2. The method of claim 1, wherein the customized tip further comprises shoulders cooperatively extending a width greater than the width of the channel.

3. The method of claim 2, wherein the channel comprises a bottom surface and two opposing side surfaces, wherein the shoulders are pressed against top edges of the two opposing side surfaces and a contact surface of the first portion of the customized tip presses against the bottom surface of the channel during the actuating of the scrail.

4. The method of claim 1, wherein the actuating of the scrail comprises pulling a trigger of the pneumatic device, wherein the pneumatic device is configured to drive the scrail at a force sufficient to pierce the cladding and the surface.

5. The method of claim 1, wherein the first portion of the customized tip comprises two spaced-apart prongs with a nose of the pneumatic device located therebetween.

6. The method of claim 5, wherein the nose of the pneumatic device protrudes approximately an equal length from a body of the pneumatic device as the two spaced-apart prongs of the customized tip, such that the two spaced-apart prongs and the nose of the pneumatic device both contact a bottom of the channel during the step of actuating the scrail.

7. The method of claim 1, wherein the width of the channel is between ⅜-inch and ½-inch or between ¼-inch and ⅝-inch.

8. The method of claim 1, further comprising placing the first portion of the customized tip into the channel of the cladding at a second location along the length of the channel, thereby pressing the cladding against the surface at the second location, and actuating the scrail through the opening of the customized tip, through the cladding at the second location, and at least partially into the surface via the pneumatic device.

9. The method of claim 1, further comprising attaching a cladding cover piece to the cladding or the channel of the cladding.

10. A method for attaching cladding to a frame of a door or window using a pneumatic device and a customized tip attached to the pneumatic device, the method comprising:

placing cladding against the frame with a backside of a bottom of a channel of the cladding pressed against the frame;

placing two prongs of the customized tip in the channel of the cladding, wherein the customized tip further includes shoulders pressed against opposite top edges of the channel when the two prongs are placed into the channel; and actuating a scrail through an opening of the customized tip, between the two prongs, through the cladding, and at least partially into the frame via the pneumatic device while the shoulders are pressed against the opposite top edges and the two prongs are placed into the channel.

11. The method of claim 10, wherein the actuating comprises pulling a trigger of the pneumatic device, wherein the pneumatic device is configured to drive the scrail at a force sufficient to pierce the cladding and the frame.

12. The method of claim 10, wherein the shoulders cooperatively extend a width greater than a width of the channel.

13. The method of claim 10, wherein placing the two prongs of the customized tip in the channel further comprises pressing the two prongs against the bottom surface of the channel, thereby pressing the backside of the bottom of the channel against the frame.

14. The method of claim 10, wherein a nose of the pneumatic device protrudes from a body of the pneumatic device by an amount corresponding to a length of each of the two prongs of the customized tip, such that the two prongs and the nose of the pneumatic device both contact the bottom of the channel during the step of actuating the scrail.

15. The method of claim 10, wherein a nose of the pneumatic device is located between the two prongs during the actuating of the scrail.

16. The method of claim 10, wherein the width of the channel is between ⅜-inch and ½-inch or between ¼-inch and ⅝-inch.

17. The method of claim 10, further comprising attaching a cladding cover piece to the cladding or the channel of the cladding after actuating the scrail.

* * * * *